United States Patent
Lynam

(10) Patent No.: US 8,564,476 B2
(45) Date of Patent: Oct. 22, 2013

(54) RADAR APPARATUS WITH AMPLIFIER DUPLEXER

(75) Inventor: David Lynam, Stevenage (GB)

(73) Assignee: MBDA UK Limited, Stevenage, Hertfordshire (GB)

( * ) Notice: Subject to any disclaimer, the term of this patent is extended or adjusted under 35 U.S.C. 154(b) by 125 days.

(21) Appl. No.: 12/863,536

(22) PCT Filed: May 7, 2010

(86) PCT No.: PCT/GB2010/050743
§ 371 (c)(1),
(2), (4) Date: Jan. 18, 2011

(87) PCT Pub. No.: WO2010/128331
PCT Pub. Date: Nov. 11, 2010

(65) Prior Publication Data
US 2011/0109500 A1    May 12, 2011

(30) Foreign Application Priority Data

May 8, 2009  (EP) .................................. 09251279
May 8, 2009  (GB) .................................. 0907900.5

(51) Int. Cl.
*G01S 13/00* (2006.01)
(52) U.S. Cl.
USPC .......................................... 342/175; 333/101
(58) Field of Classification Search
USPC ............................................ 342/175; 333/101
See application file for complete search history.

(56) References Cited

U.S. PATENT DOCUMENTS

| | | | |
|---|---|---|---|
| 4,160,975 A | 7/1979 | Steudel | |
| 4,380,765 A * | 4/1983 | Godfrey et al. | 342/153 |
| 4,438,436 A * | 3/1984 | Murphy | 342/153 |
| 5,017,929 A | 5/1991 | Tsuda | |
| 5,606,324 A | 2/1997 | Justice et al. | |

(Continued)

FOREIGN PATENT DOCUMENTS

| | | |
|---|---|---|
| DE | 35 25 778 A1 | 3/1986 |
| GB | 794 441 A | 5/1958 |

(Continued)

OTHER PUBLICATIONS

Partial European Search Report for EP Application No. EP 09251279, completed Nov. 19, 2009.

(Continued)

*Primary Examiner* — Timothy A Brainard
(74) *Attorney, Agent, or Firm* — Buchanan Ingersoll & Rooney PC

(57) ABSTRACT

An amplifier/duplexer for an antenna channel of a radar apparatus, comprises a first hybrid junction having two input/output ports for connection into the antenna channel, and two further ports each connected to a parallel combination comprising an amplifier and switching means switchable between a transmit condition in which it presents an open circuit and a receive condition in which it presents a short circuit so that a signal received in the antenna channel is applied to one of the input/output ports and reflected to the other input/output port each amplifier having an input connected to a respective output port of a further hybrid junction, an input port of the further hybrid junction being configured to receive a signal for transmission so that when the switching means is in the transmit condition the transmission signal is amplified by the amplifiers and delivered through the first hybrid junction to the antenna channel.

18 Claims, 3 Drawing Sheets

(56) References Cited

U.S. PATENT DOCUMENTS

Figure 1:
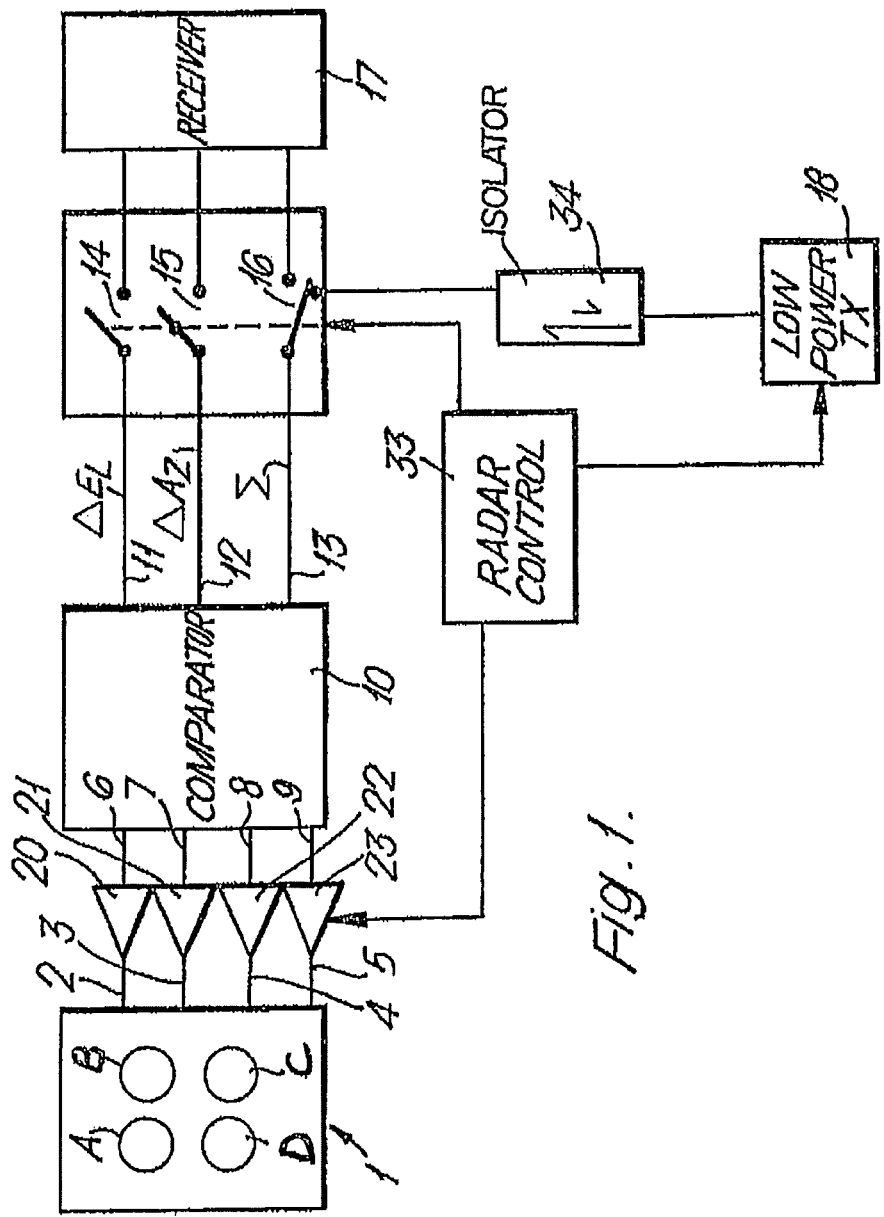

| | | | |
|---|---|---|---|
| 6,195,035 | B1 | 2/2001 | Wood |
| 6,320,541 | B1 | 11/2001 | Pozgay et al. |
| 2003/0156060 | A1 | 8/2003 | Revankar et al. |

FOREIGN PATENT DOCUMENTS

| | | | |
|---|---|---|---|
| GB | 1 605 163 A | | 8/1982 |
| GB | 1 365 027 A | | 7/2013 |
| JP | 2000-349549 A | | 12/2000 |

OTHER PUBLICATIONS

European Search Report for EP Application No. EP 09251279, completed Jan. 27, 2010.
Great Britain Search Report for GB0907900.5, dated Sep. 3, 2009.
International Search Report (PCT/ISA/210) issued on Nov. 5, 2010, by United Kingdom Patent Office as the International Searching Authority for International Application No. PCT/GB2010/050743.
Annex to Form PCT/ISA/206, Communication Relating to the Results of the Partial International Search Report, issued on Aug. 12, 2010.
International Search Report (Form PCT/ISA/210)and the Written Opinion of the International Searching Authority (Form PCT/ISA/237) dated Aug. 5, 2010, issued in the corresponding International Application No. PCT/GB2010/050742.
Grate Britain Search Report dated Aug. 24, 2009, issued in the corresponding Application No. GB0907899.9.
European Search Report dated Oct. 22, 2009, issued in the corresponding Application No. EP 09 25 1280.
Lynam, U.S. Appl. No. 13/057,915, entitle "Radar Apparatus" Filed on Feb. 7, 2011.

\* cited by examiner

RADAR APPARATUS WITH AMPLIFIER DUPLEXER

The present invention relates to active radar apparatus, especially but not exclusively a monopulse radar and in particular to a monopulse radar for use in a missile seeker.

In a monopulse radar two, four or more separate channels transmit the same RF signal at the same time but receive ground return echoes independently. The feeds are typically horn antennas for mechanical dish antennae or individual sub-arrays for phased-array antenna. In a four channel system, each feed antenna is placed within a quadrant of the antenna. In a phase comparison (or combined amplitude and phase comparison) radar the beams from the four quadrants (A, B, C, D) are fed to a monopulse comparator where the sum and difference signals in azimuth and elevation are formed as follows:

$$\Sigma = A+B+C+D$$

$$\Delta_{az} = (A+B)-(C+D)$$

$$\Delta_{el} = (A+D)-(B+C)$$

The sum and difference components are fed to the receiver where they are demodulated and processed in a known manner to provide phase error signals to the missile guidance system.

Conventionally, the signal to be transmitted is fed to the sum channel of the comparator, divided by the comparator and supplied equally to the four antenna channels. A duplexer (transmit/receive switch or circulator and limiter) is provided in the sum channel to isolate the receiver from the transmitter whilst it is transmitting if damage to the receiver or loss of transmitter power is to be avoided. However such duplexers can cause difficulties in achieving phase and amplitude tracking between the sum and difference channels in the microwave receiver.

The present invention can facilitate an architecture which avoids the need for a transmit/receive switch in the sum channel. Indeed, it can facilitate the avoidance of a comparator altogether.

The present invention can achieve this by offering an alternative means of inputting a signal to be transmitted to the antenna channels.

Thus the invention provides in one aspect an amplifier/duplexer for an antenna channel of a radar apparatus, comprising a first hybrid junction having two input/output ports for connection into the antenna channel, and two further ports each connected to a parallel combination comprising a transmission signal amplifier and switching means switchable between a transmit condition in which an amplified signal for transmission is passed to the antenna channel and a receive condition in which a signal received in the antenna channel is applied to one of the input/output ports and reflected to the other input/output port, characterised by each amplifier being configured to receive the signal for transmission other than via the sum port of a comparator and by a phase length adjuster which is disposed in the path of the transmission signal so that the amplified signal for transmission has a required phase.

The phase length adjuster may be a further hybrid junction, each amplifier having an input connected to an output port of the further hybrid junction, an input port of the further hybrid junction being configured to receive the signal for transmission so that when the switching means is in the transmit condition the transmission signal passes via different paths through the further hybrid junction to the amplifiers and is delivered through the first hybrid junction to the antenna channel.

In a further aspect the invention provides an amplifier/duplexer for an antenna channel of a radar apparatus, comprising a first hybrid junction having two input/output ports for connection into the antenna channel, and two further ports each connected to a parallel combination comprising an amplifier and switching means switchable between a transmit condition and a receive condition in which a signal received in the antenna channel is applied to one of the input/output ports and reflected to the other input/output characterised in that each amplifier has an input connected to a respective output port of a further hybrid junction, an input port of the further hybrid junction being configured to receive a signal for transmission so that when the switching means is in the transmit condition the transmission signal is amplified by the amplifiers and delivered through the first hybrid junction to the antenna channel.

In a preferred embodiment, the switching means presents an open circuit when in the transmit condition, and a short circuit when in the receive condition.

A fourth port of the said further hybrid junction may be terminated. Each amplifier may be connected between the first hybrid junction and the further hybrid junction so that the path lengths for the transmission signal from the input port of the further hybrid junction to the antenna channel are the same.

The amplifier/duplexer may be configured such that the transmission signal passes through between diagonally opposite ports of one of the hybrid junctions and through adjacent ports of the other hybrid junction.

The switch means may be a PIN diode or other controllable resistance device switchable between a first bias condition and a second bias condition.

The amplifiers may be linear amplifiers.

The invention also provides radar apparatus comprising an amplifier/duplexer as set forth above.

Thus the radar apparatus may comprise a first antenna channel and a second antenna channel each having an amplifier/duplexer as set forth above, the apparatus comprising means for supplying transmission signals to the each amplifier/duplexer via a splitter from a common source.

When the radar apparatus is a four-channel monopulse radar apparatus, each antenna channel may have an amplifier/duplexer as set forth above, the apparatus comprising means for supplying transmission signals to each of the amplifier/duplexers via cascaded splitters from a common source.

Preferably each of the said splitters provides co-phased and isolated outputs (e.g. a Wilkinson hybrid or a Magic-tee).

Figure 2:
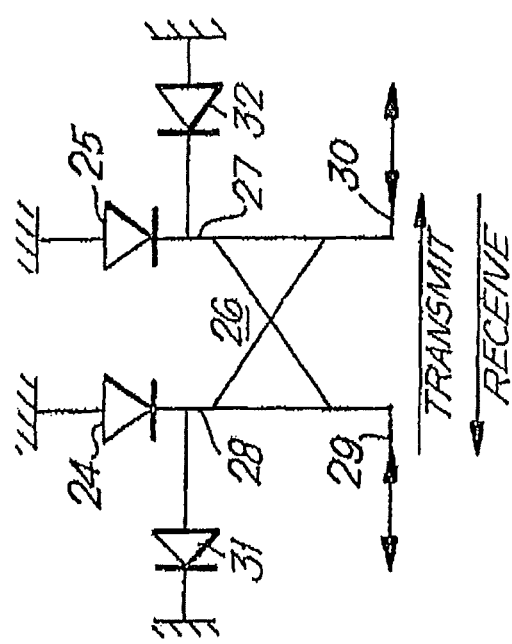
Figure 3:
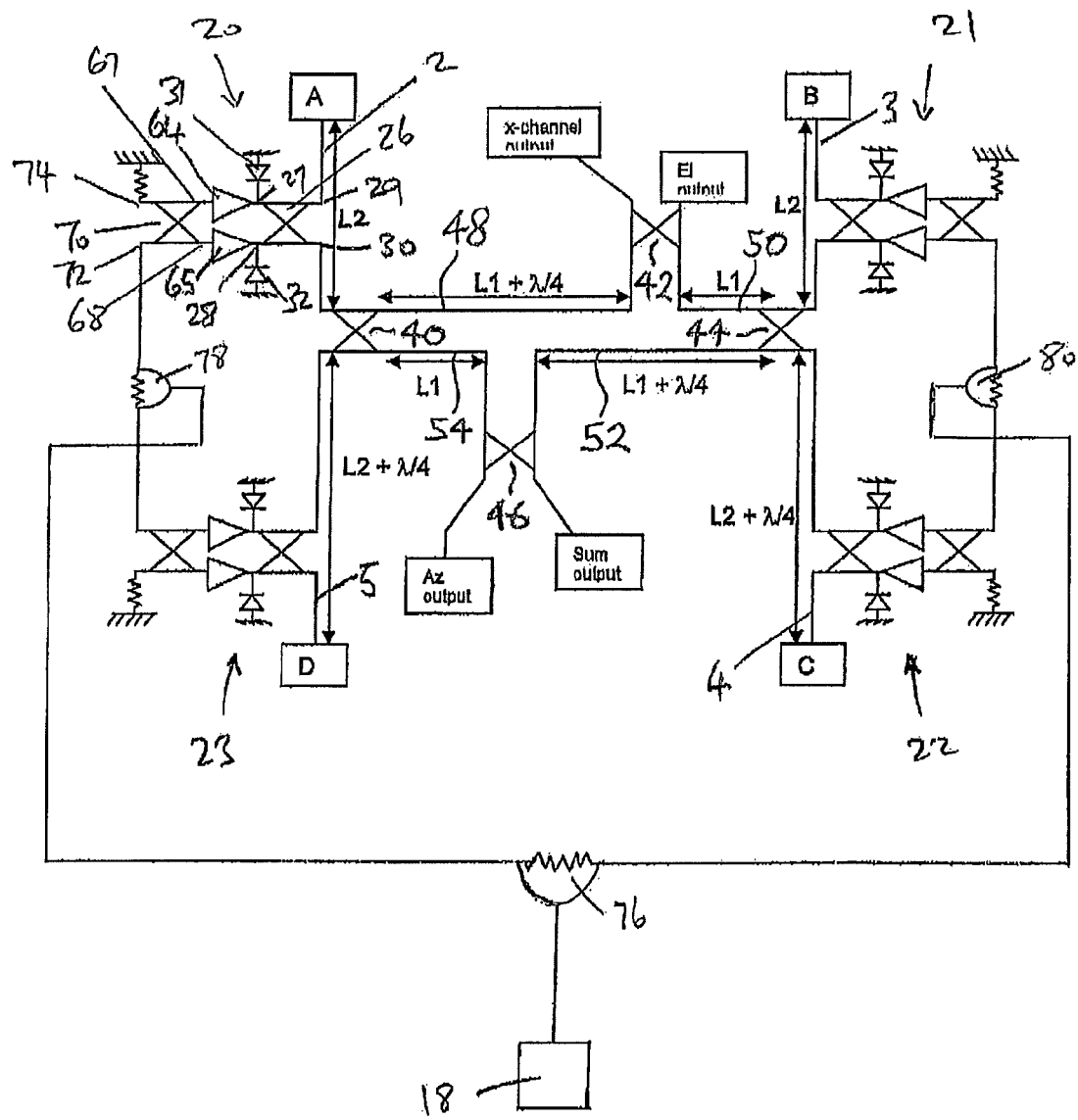

The invention will be described merely by way of example with reference to the accompanying drawings, wherein FIGS. 1 and 2 show a prior art radar apparatus, and FIG. 3 shows a radar apparatus according to the invention, Referring to FIGS. 1 and 2, which are based on our earlier specification GB1605163A, an active pulse Doppler radar comprises a multi channel transmit/receive antenna system 1 having four elements A, B, C, and D respectively connected by individual antenna channels 2, 3, 4 and 6 to input terminals 6, 7, 8 and 9 of a comparator 10 in known manner. The comparator 10 is arranged to process signals received from the four antenna elements A, B, C and D and to provide an elevation difference signal $\Delta E_L$ at an output terminal 11, and azimuth difference signal $\Delta A_Z$ at an output terminal 12 and a sum signal $\Sigma$ at an output terminal 13. The difference signals $\Delta E_L$ and $\Delta E_Z$ and the sum signal $\Sigma$ are passed by way of respective blanking switches 14, 15 and 16 to a receiver 17.

The blanking switch 16 constitutes a changeover switch and is also arranged to connect a relatively low power transmitter 18 to the sum terminal 13 of the comparator 100 so that the individual elements A, B, C and D of the antenna system 1 may consequently be uniformly energised by way of the respective channels 2, 3, 4 and 5, their outputs being nominally coherent and combined in free space. Each of the channels 2, 3, 4 and 5 incorporates a respective individual output power amplifier/duplexer 20, 21, 22 and 23.

As shown in FIG. 2, each of the amplifiers/duplexers 20-23 comprises a 3 dB quadrature hybrid junction 26, having input/output ports 29, 30 connected in the other antenna channel 2, 3, 4 or 5. The remaining two ports 27, 28 of the junction 26 each are terminated by a parallel combination comprising a negative resistance device 24, 25 (in particular an IMPATT diode) and a PIN diode 31. The IMPATT diodes 24 and 25 are injection locked oscillators which, at the transmission frequency of the radar act as amplifiers, their power being combined in the hybrid 26.

The overall pulsed operation of the system is controlled by control means 33 which makes the various changes at each transition between transmission and reception in known manner. Thus during transmission the blanking switches 14, 15 and 16 are controlled, the transmitter 18 is pulsed, and the amplifiers/duplexers 20-23 have their IMPATT diodes suitably biased, the PIN diodes being at this time reverse biased and thus open-circuited. The signals from the transmitter 18 are applied to the input/output port 29, are incident upon the diodes 24 and 25, and are amplified and re-combined at the input/output port 30 of the hybrids 26 with some small losses due to the phase or amplitude imbalance in the hybrids 26 giving rise to reflection losses.

The amplifier/duplexers 20-23 can be expected to give a net power gain of substantially 10 dB each during transmission. They must however act as reciprocal (duplexing) devices permitting the passage of return signals during reception with only minimal (e.g. 0.5 dB) loss. To achieve this the ports 27, 28 are terminated during reception by a large mismatch. This is done by forward biasing the PIN diodes 31, 32 to short circuit the ports 27, 28 to ground. The IMPATT diodes can be un-biased or forward biased during reception because, due to the presence of the short circuit through the PIN diodes, their condition is unimportant, although they must not be transmitting (reverse biased). Each PIN diode has only to withstand the power from one of the IMPATT diodes 24, 25 when it is reverse-biased (off).

In FIG. 3, which shows a radar according to the invention, features already described carrying the same reference numerals as in FIGS. 1 and 2. The comparator 10 is expanded to show its constituent parts, namely 90° hybrid couplers 40, 42, 44, 46 connected by internal lines 48, 50, 52, 54. It will be noted that, as is conventional, lines 48 and 52 are $\lambda/4$ longer than lines 50 and 54, and that antenna channels 4 and 5 to antenna elements C and D are $\lambda/4$ longer than channels 2 and 3 to antenna elements A and B, $\lambda$ being the wavelength of the transmitted signal. The comparator 10 can also be constructed with 0°, 180° hybrids (e.g. Magic-Tee), in which case the $\lambda/4$ additional lengths of lines 48 and 52 and antenna channels 4 and 5 to antenna elements C and D are not required.

The invention differs from FIGS. 1 and 2 in that the signal to be transmitted is not applied via the sum port of the comparator, but is split and applied via the amplifier/duplexers 20-23. Thus in each of these units, the IMPATT diodes 24, 25 are replaced by linear amplifiers 64, 65. The inputs of the linear amplifiers are connected respectively to output ports 67, 68 of a further 3 dB quadrature hybrid junction 70. Of the remaining two ports of the junction, one 72 is utilised as an input for the split transmission signal. The other 74 is loaded and terminated.

The output of the low power transmitter 18 is taken to a co-phased hybrid splitter 76 (e.g. a Wilkinson hybrid or Magic Tee), the two outputs of which are split again in further similar hybrids 78, 80. The resulting four coherent signals for transmission are applied respectively to the inputs 72 of the hybrid junction 70 in each of the amplifier/duplexers 20-23. The hybrid 70 junction acts as a phase adjuster so that the phase length of the signals through the two amplifiers 64, 65 of each amplifier/duplexer to the antenna channel is the same. For amplifier 64 the signal encounters a $\lambda/2$ phase delay in passing diagonally though the hybrid junction 70, and a $\lambda/4$ delay in passing between adjacent ports of hybrid junction 26, a total of $3\lambda/4$. A signal passing through amplifier 65 encounters a $\lambda/4$ phase delay in junction 70 and a $\lambda/2$ delay in junction 26, again a total of $3\lambda/4$. Thus provided that care is taken to keep corresponding physical path lengths between the splitter 76 and the amplifier/duplexers 20-23 the same, and equally to match physical path lengths within the amplifier/duplexers, the amplified signals for transmission supplied to the antenna channels A B C D will be in phase with each other (coherent). This of course also depends on the splitters 78, 80 being matched, and on the components of each amplifier/duplexer being matched to those of the others. Dimensional matching can be facilitated by manufacturing the amplifier/duplexer as printed arrays.

In the event that phase differences do arise, the amplifiers 64, 65 can be calibrated and adjusted as described in our above-mentioned co-pending application reference XA2142, the disclosure of which is incorporated herein by reference. In the absence of such adjustment, mismatching in the amplifier stages results in energy being coupled to all receiver ports of the comparator. Hence the isolators or blanking switches 14-16 of FIG. 1 should still be provided. However in the described embodiment they only need to withstand significantly lower power than if the full transmitter power were to be coupled via the cross-channel 56.

Failure of one of the pair of amplifiers 64, 65 is a soft failure, in that there will continue to be an output from the other one of the pair. However, power from the remaining one of the pair will be split between the antenna and whatever termination is presented by the receiver blanking. Additionally, there will be a loss of effective radiated power because the free-space combining will result in a spread of the beam (loss of gain) due to the imbalance between the quadrants. If continued but degraded operation is required, then the receiver blanking needs to be absorptive to reduce re-reflection within the feed network into the transmit stages. The reflected power to be absorbed when one amplifier fails is one sixteenth of the total power output of the transmitter.

The preferred embodiments of the invention could be well suited to a millimetric active system. The high-power circulators and isolators that are required for these wavelengths are usually quite large in comparison to other components. Pin diodes for T/R switches tend to be lower power if fast switching is required. The preferred embodiments of the invention use neither of these components in critical positions for either performance or space-envelope. There are no active components required in the transmit output path. This not only avoids the need for components to withstand high power, but also reduces the transmit losses.

Also, the comparator 10 can be omitted and the $\Sigma$, $\Delta_{EL}$ and $\Delta_{AZ}$ processing deferred until after demodulation of the incoming RF received signal to baseband.

The preferred embodiments of the invention have the advantage of being simpler than those of GB1605163A. A further advantage is that the distributed amplification of the transmitted signal avoids the need for components having high power-handling capability.

Although as hitherto described the PIN diodes 31, 32 are biased between an off and a short-circuit (fully "on") state, it is possible to bias them in the on state so as to have a significant resistance. Then controlled attenuation of the received signal passing through the hybrid junction 26 can be provided. Instead of the signal passing substantially without loss through the junction 26, its is attenuated by an amount controlled by the proportion of the signal which is allowed to pass through the PIN diode to ground.

Also, instead of being biased by the control signal from the controller 33 (FIG. 2), the PIN diodes can be self-biased by rectifying the received signal, and applying it across a resistance to develop a bias current for the PIN diodes and thereby forward biasing them into their conducting state. This creates a passive limiter function.

Both of these functions (active attenuator and passive limiter) can be implemented singly or together without the need for additional components in the received signal path, and thus produce no additional unwanted RF loss Although described in the context of a four-quadrant monopulse antenna, the amplifier/duplexer can be used with larger array antennas, since the monopulse comparator is a subset of the more general Butler matrix.

The reader also is referred to our related application reference GB0907899 (XA2448) entitled Radar Apparatus, and filed on the 8 May 2009. The disclosure of that application is incorporated herein by reference.

The invention claimed is:

1. An amplifier/duplexer for an antenna channel of a radar apparatus, comprising:
a first hybrid junction having two input/output ports for connection into the antenna channel, and two further ports each connected to a parallel combination comprising an amplifier and switching means switchable between a transmit condition and a receive condition in which a signal received in the antenna channel is applied to one of the input/output ports and reflected to the other input/output port wherein each amplifier has an input connected to a respective output port of a further hybrid junction, an input port of the further hybrid junction being configured to receive a signal for transmission so that when the switching means is in the transmit condition the transmission signal is amplified by the amplifiers and is delivered through the first hybrid junction to the antenna channel.

2. An amplifier/duplexer as in claim 1, wherein the switching means presents an open circuit when in the transmit condition and a short circuit when in the receive condition.

3. An amplifier/duplexer as in claim 1, wherein a fourth part of the said further hybrid junction is terminated.

4. An amplifier/duplexer as in claim 1, wherein each amplifier is connected between the first hybrid junction and the further hybrid junction so that the path lengths for the transmission signals from the input port of the further hybrid junction to the antenna channel are the same.

5. An amplifier/duplexer as in claim 1, and configured such that the transmission signal passes through between diagonally opposite ports of one of the hybrid junctions and through adjacent ports of the other hybrid junction.

6. An amplifier/duplexer as in claim 1 wherein the switching means is a PIN diode or other controllable resistance device switchable between a first bias condition and a second bias condition.

7. Radar apparatus comprising an amplifier/duplexer as in claim 1.

8. Radar apparatus as in claim 7, having a first antenna channel and a second antenna channel each having a said amplifier/duplexer, the apparatus comprising means for supplying transmission signals to each amplifier/duplexer via a splitter from a common source.

9. Radar apparatus as in claim 8 wherein said splitter is a co-phased hybrid.

10. Radar apparatus as in claim 7 being a four channel monopulse radar apparatus, each channel having a said amplifier/duplexer, the apparatus comprising means for supplying transmission signals to each of the amplifier/duplexer via cascaded splitters from a common source.

11. An amplifier/duplexer as in claim 1, wherein the switching means is a PIN diode or other controllable resistance device switchable between a first bias condition and a second bias condition.

12. An amplifier/duplexer for an antenna channel of a radar apparatus, comprising:
a first hybrid junction having two input/output ports for connection into the antenna channel, and two further ports each connected to a parallel combination comprising an amplifier and switching means switchable between a transmit condition in which it presents an open circuit and a receive condition in which it presents a short circuit so that a signal received in the antenna channel is applied to one of the input/output ports and reflected to the other input/output wherein each amplifier has an input connected to a respective output port of a further hybrid junction, an input port of the further hybrid junction being configured to receive a signal for transmission so that when the switching means is in the transmit condition the transmission signal is amplified by the amplifiers and delivered through the first hybrid junction to the antenna channel.

13. An amplifier/duplexer as in claim 12, wherein the switching means presents an open circuit when in the transmit condition and a short circuit when in the receive condition.

14. An amplifier/duplexer as in claim 12, wherein a fourth part of the said further hybrid junction is terminated.

15. An amplifier/duplexer as in claim 12, wherein each amplifier is connected between the first hybrid junction and the further hybrid junction so that the path lengths for the transmission signals from the input port of the further hybrid junction to the antenna channel are the same.

16. An amplifier/duplexer as in claim 12, and configured such that the transmission signal passes through between diagonally opposite ports of one of the hybrid junctions and through adjacent ports of the other hybrid junction.

17. An amplifier/duplexer as in claim 12, wherein the switching means is a PIN diode or other controllable resistance device switchable between a first bias condition and a second bias condition.

18. An amplifier/duplexer for an antenna channel of a radar apparatus comprising:
a first hybrid junction having two input/output ports for connection into the antenna channel, and two further ports each connected to a parallel combination comprising an amplifier and a controllable resistance device switchable between a transmit condition in which it presents an open circuit and a receive condition in which it presents a short circuit so that a signal received in the antenna channel is applied to one of the input/output ports and reflected to the other input/output wherein each amplifier has an input connected to a respective output port of a further hybrid junction, an input port of the further hybrid junction being configured to receive a signal for transmission so that when the controllable resistance device is in the transmit condition the transmission signal is amplified by the amplifiers and delivered through the first hybrid junction to the antenna channel.

\* \* \* \* \*